United States Patent
Aiba (10) Patent No.: US 10,095,299 B2
(45) Date of Patent: Oct. 9, 2018

(54) ELECTRONIC DEVICE THAT APPROPRIATELY SETS FREQUENCY OF TEMPORARY WAKE-UP STATE AND RECORDING MEDIUM THEREFOR

(71) Applicant: KYOCERA Document Solutions Inc., Osaka (JP)

(72) Inventor: Masaaki Aiba, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 102 days.

(21) Appl. No.: 15/464,797

(22) Filed: Mar. 21, 2017

(65) Prior Publication Data

US 2017/0315604 A1 Nov. 2, 2017

(30) Foreign Application Priority Data

Apr. 27, 2016 (JP) .................... 2016-089009

(51) Int. Cl.
G06F 1/32 (2006.01)
(52) U.S. Cl.
CPC .......... G06F 1/3234 (2013.01); G06F 1/3293 (2013.01)
(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

| | | | |
|---|---|---|---|
| 2006/0090092 A1* | 4/2006 | Verhulst | G06F 1/12 713/400 |
| 2006/0193013 A1* | 8/2006 | Hoshi | H04N 1/00708 358/474 |
| 2006/0200254 A1* | 9/2006 | Krause | G05B 19/0421 700/20 |
| 2008/0133953 A1* | 6/2008 | Kawaji | G06F 1/3209 713/322 |
| 2011/0231026 A1* | 9/2011 | Yaoyama | G03G 15/5004 700/291 |
| 2011/0286027 A1* | 11/2011 | Nozawa | G03G 15/5004 358/1.14 |
| 2011/0320842 A1* | 12/2011 | Narushima | G03G 15/5004 713/323 |
| 2013/0010335 A1* | 1/2013 | Baba | G03G 15/5004 358/3.01 |

(Continued)

FOREIGN PATENT DOCUMENTS

JP 2014-231175 A 12/2014

*Primary Examiner* — Zahid Choudhury
(74) *Attorney, Agent, or Firm* — Stein IP, LLC (57) ABSTRACT

An electronic device includes a first processing unit and a second processing unit that has a power state control unit and executes a process corresponding to received data with which the first processing unit is not compatible. When the received data is present in a non-wake-up state, the power state control unit sets a power state of the electronic device to a temporary wake-up state regardless of a period set as a time period of the non-wake-up state to obtain an actual time period of the non-wake-up state as a basic value for calculating the time period of the non-wake-up state. The power state control unit sets average value of a plurality of obtained latest basic values as the time period of the non-wake-up state.

6 Claims, 8 Drawing Sheets

(56) References Cited

U.S. PATENT DOCUMENTS

2014/0002844 A1\* 1/2014 Miyamoto ......... G06K 15/4055
  358/1.13
2014/0355052 A1 12/2014 Mikashima .................. 358/1.15

\* cited by examiner

ELECTRONIC DEVICE THAT APPROPRIATELY SETS FREQUENCY OF TEMPORARY WAKE-UP STATE AND RECORDING MEDIUM THEREFOR

INCORPORATION BY REFERENCE

This application is based upon, and claims the benefit of priority from, corresponding Japanese Patent Application No. 2016-089009 filed in the Japan Patent Office on Apr. 27, 2016, the entire contents of which are incorporated herein by reference.

BACKGROUND

Unless otherwise indicated herein, the description in this section is not prior art to the claims in this application and is not admitted to be prior art by inclusion in this section.

There is a typical image forming apparatus that includes a first processing unit configured to execute a process corresponding to received data and a second processing unit configured to execute a process correspond to received data with which the first processing unit is not compatible. The above image forming apparatus has a power state including a normal state where the second processing unit can execute the process corresponding to the received data and a power-saving state where a supply of an electric power to the second processing unit is halted at least temporarily such that the process corresponding to the received data is executable by the first processing unit. The power-saving state repeats a temporary wake-up state where the electric power is temporarily supplied to the second processing unit and a non-wake-up state where the supply of the electric power to the second processing unit is halted. The above image forming apparatus increases a time period of the non-wake-up state when a time period of the temporary wake-up state is increased.

SUMMARY

An electronic device according to an aspect of the disclosure includes a first processing unit and a second processing unit. The first processing unit executes a process corresponding to received data. The second processing unit executes a process corresponding to the received data with which the first processing unit is not compatible. The electronic device includes a power state control unit that controls a power state of the electronic device. The power state includes: a normal state where the second processing unit executes the process corresponding to the received data, and a power-saving state where a supply of an electric power to the second processing unit is halted at least temporarily while the first processing unit executes the process corresponding to the received data. The power-saving state repeats: a temporary wake-up state where the electric power is temporarily supplied to the second processing unit, and a non-wake-up state where the supply of the electric power to the second processing unit is halted. When the received data with which the first processing unit is not compatible is present in the non-wake-up state, the power state control unit sets the power state of the electronic device to the temporary wake-up state regardless of a period set as a time period of the non-wake-up state, so as to obtain an actual time period of the non-wake-up state as a basic value for calculating the time period of the non-wake-up state. The power state control unit sets an average value of a plurality of obtained latest basic values as the time period of the non-wake-up state.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes an embodiment of the disclosure by referring to the drawings.

First, a description will be given of a configuration of a Multifunction Peripheral (MFP) as an electronic device according to the embodiment.

Figure 1:
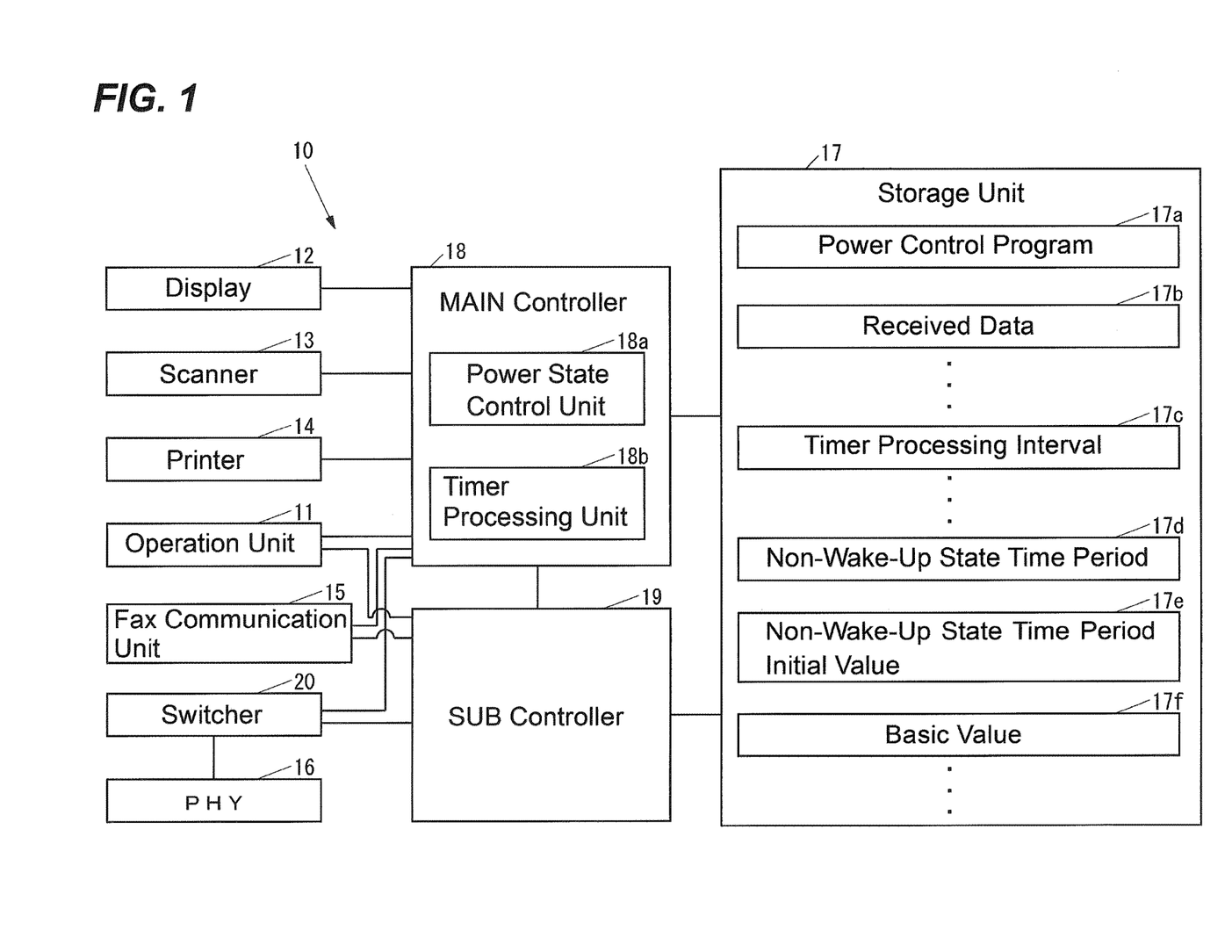
FIG. 1 illustrates a block diagram of an MFP according to an embodiment of the disclosure.

FIG. 1 illustrates a block diagram of an MFP 10 according to the embodiment.

As illustrated in FIG. 1, the MFP 10 includes an operation unit 11, a display 12, a scanner 13, a printer 14, a fax communication unit 15, a PHY 16, a storage unit 17, a main controller (MAIN Controller) 18, a sub controller (SUB Controller) 19, and a switcher (Switcher) 20. The operation unit 11 is an input device such as a button to which various operations are input. The display 12 is a display device such as a Liquid Crystal Display (LCD) that displays various information. The scanner 13 is a reading device that reads an image from an original document. The printer 14 is a print device that executes a print job on a recording medium such as a paper sheet. The fax communication unit 15 is a fax device that performs fax communication with an external facsimile device (not illustrated) via a communication line such as a dial-up line. The PHY 16 is a network communication device that communicates with an external device via a network such as a Local Area Network (LAN). The storage unit 17 is a non-volatile storage device such as a semiconductor memory and a Hard Disk Drive (HDD) that store various kinds of information. The MAIN Controller 18 is a device that executes a process corresponding to received data of all protocols that the MFP 10 supports. The SUB Controller 19 is a device that executes a process corresponding to received data of only a part of the protocols among all the protocols that the MFP 10 supports. The Switcher 20 is a device that switches transmission and reception of a network packet to any of the MAIN Controller 18 and the SUB Controller 19.

The storage unit 17 stores a power control program 17*a* for controlling power of the MFP 10. The power control program 17*a* may be installed into the MFP 10 at production stage of the MFP 10, may be additionally installed into the MFP 10 from an external storage medium, such as an SD card and a Universal Serial Bus (USB) memory, or may be additionally installed into the MFP 10 from a network.

The storage unit 17 can store a plurality of pieces of received data 17*b* by the PHY 16.

The storage unit 17 can store a timer processing interval 17*c* indicating a time interval of timer processing (described below) for each kind of the timer processing.

The storage unit 17 can store a non-wake-up state time period 17*d* indicating a time period of a non-wake-up state (described below) and a non-wake-up state time period initial value 17*e* indicating an initial value of the non-wake-up state time period 17*d*.

The storage unit 17 can store a plurality of basic values 17*f* as a base for the calculation of the non-wake-up state time period 17*d*.

The MAIN Controller 18 includes, for example, a Central Processing Unit (CPU), a Read Only Memory (ROM), and a Random Access Memory (RAM). The ROM stores programs and various data. The RAM is used as a work area for the CPU in the MAIN Controller 18 itself. The CPU in the MAIN Controller 18 executes the program stored in the storage unit 17 or the ROM in the MAIN Controller 18.

The SUB Controller 19 similarly includes, for example, a CPU, a ROM that stores programs and various data, and a RAM used as a work area for the CPU in the SUB Controller 19 itself. The CPU in the SUB Controller 19 executes the program stored in the ROM in the SUB Controller 19.

The MAIN Controller 18 can execute processing corresponding to received data of a protocol with which the SUB Controller 19 is not compatible. For example, the MAIN Controller 18 can execute a printing process by the printer 14 corresponding to received data of a protocol for printing, such as a Line PRinter daemon protocol (LPR) and a Raw protocol. However, the SUB Controller 19 cannot execute the printing process by the printer 14 corresponding to the received data of the protocol for printing. Namely, the MAIN Controller 18 and the SUB Controller 19 respectively constitute a second processing unit and a first processing unit of the disclosure.

The MAIN Controller 18 can request an update of a lease period of an Internet Protocol (IP) address of the MFP 10 as a Dynamic Host Configuration Protocol (DHCP) client to a DHCP server before the lease period ends. On the other hand, the SUB Controller 19 cannot update the lease period of the IP address of the MFP 10 on the performance.

The MAIN Controller 18 can transmit a report mail as an e-mail for notifying various states of the MFP 10, such as a toner remaining amount and a counter value of printing, of the printer 14, for every time interval indicated by the timer processing interval 17*c*, for example, every one minute. On the other hand, the SUB Controller 19 cannot transmit the report mail on performance.

The SUB Controller 19 can execute processing corresponding to received data of a protocol, which is frequently transmitted or received in a network such as an Address Resolution Protocol (ARP).

The SUB Controller 19, as described above, can execute a small number of kinds of the processing compared with the processing executable by the MAIN Controller 18. Thus, the SUB Controller 19 may have a low performance compared with the MAIN Controller 18. For example, the CPU in the SUB Controller 19 may have a low processing performance compared with the CPU in the MAIN Controller 18. The RAM in the SUB Controller 19 may have a small storage capacity compared with the RAM in the MAIN Controller 18. When the SUB Controller 19 has the low performance compared with the performance of the MAIN Controller 18, the electric power consumed by the SUB Controller 19 is small compared with the electric power consumed by the MAIN Controller 18.

The MAIN Controller 18 is connected to the operation unit 11, the display 12, the scanner 13, the printer 14, the fax communication unit 15, the storage unit 17, the SUB Controller 19, and the Switcher 20. The MAIN Controller 18 is additionally connected to the PHY 16 via the Switcher 20.

The SUB Controller 19 is connected to the operation unit 11, the fax communication unit 15, the storage unit 17, the MAIN Controller 18 and the Switcher 20. The SUB Controller 19 is additionally connected to the PHY 16 via the Switcher 20.

The MAIN Controller 18 executes the power control program 17*a* stored in the storage unit 17 to function as: a power state control unit 18*a* that controls a power state of the MFP 10; and a timer processing unit 18*b* that intermittently repeats a specific processing (hereinafter referred to as "timer processing") executed by the MAIN Controller 18 itself corresponding to a time.

Here, the timer processing includes the above-described update of the lease period of the IP address of the MFP 10, and the above-described transmission of the report mail. An administrator of the MFP 10 is allowed to set a repeat interval of the timer processing, that is, the timer processing interval 17*c*.

Figure 2:
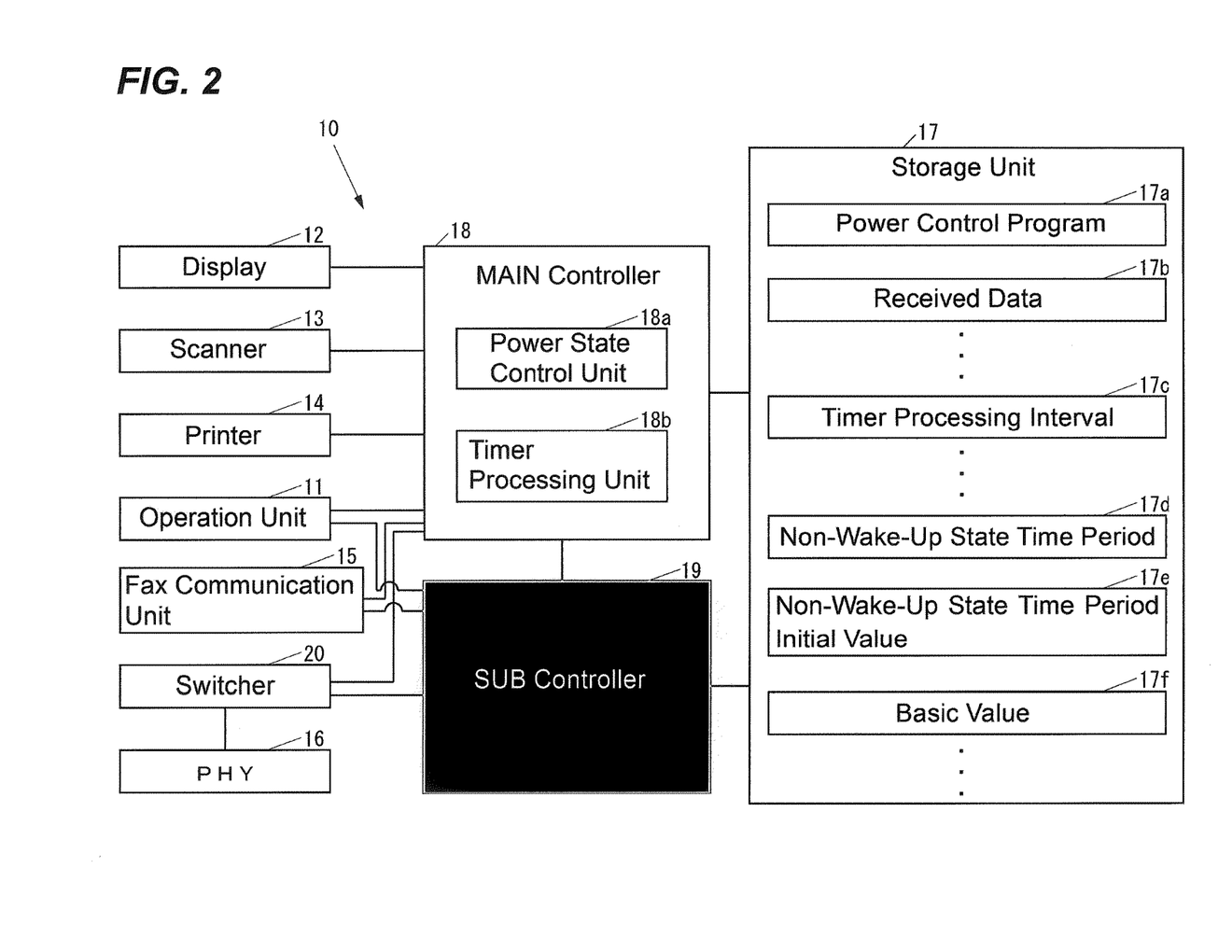
FIG. 2 illustrates a block diagram of the MFP according to the embodiment in a normal state.

FIG. 2 illustrates a block diagram of the MFP 10 in a normal state.

In FIG. 2, a device where supply of electric power is stopped is illustrated with black-and-white inversion. That is, the supply of the electric power to the SUB Controller 19 is stopped in FIG. 2. Among the components of the MFP 10 illustrated in FIG. 2, the components other than the SUB Controller 19 are supplied with the electric power.

In the normal state, the Switcher 20 switches the transmission and reception of the network packet to the MAIN Controller 18 among the MAIN Controller 18 and the SUB Controller 19. Accordingly, in the normal state, the MAIN Controller 18 executes the processing corresponding to the received data by the PHY 16.

As described above, when the electric power consumed by the SUB Controller 19 is small compared with the electric power consumed by the MAIN Controller 18, even the SUB Controller 19 is supplied with electric power, the electric power consumed by the SUB Controller 19 is considered to be small. Thus, in the normal state, the SUB Controller 19 may be supplied with electric power. When, even in the normal state, not the MAIN Controller 18 but the SUB Controller 19 executes the processing executable for the SUB Controller 19 among the processing corresponding to the received data by the PHY 16, the SUB Controller 19 needs to be supplied with electric power in the normal state. When the MAIN Controller 18 receives the received data by the PHY 16 via the SUB Controller 19, the SUB Controller 19 needs to be supplied with electric power in the normal state.

Figure 3:
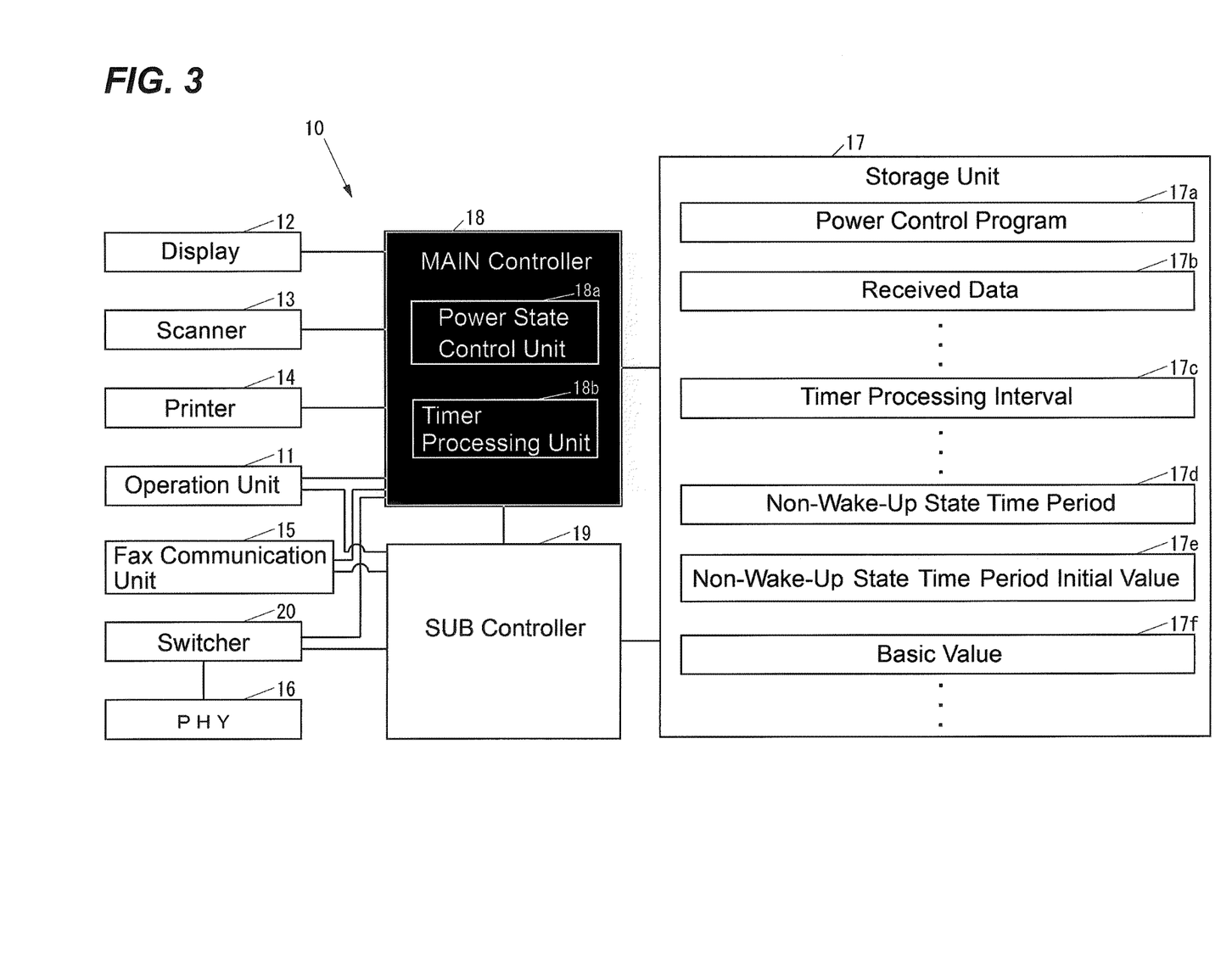
FIG. 3 illustrates a block diagram of the MFP according to the embodiment in a power-saving state.

FIG. 3 illustrates a block diagram of the MFP 10 in a power-saving state.

In FIG. 3, a device where supply of electric power is stopped is illustrated with black-and-white inversion. That is, compared with the normal state illustrated in FIG. 2, the supply of the electric power to the MAIN Controller 18 is stopped while the SUB Controller 19 is supplied with the electric power in FIG. 3. In the power-saving state, supply of electric power to at least one of various devices other than the MAIN Controller 18, which are connected to the MAIN Controller 18, for example, the printer 14 and similar unit, may be stopped.

In the power-saving state, the Switcher 20 switches the transmission and reception of the network packet to the SUB Controller 19 among the MAIN Controller 18 and the SUB Controller 19. Accordingly, the SUB Controller 19 executes the processing corresponding to the received data by the PHY 16 in the power-saving state.

Figure 4:
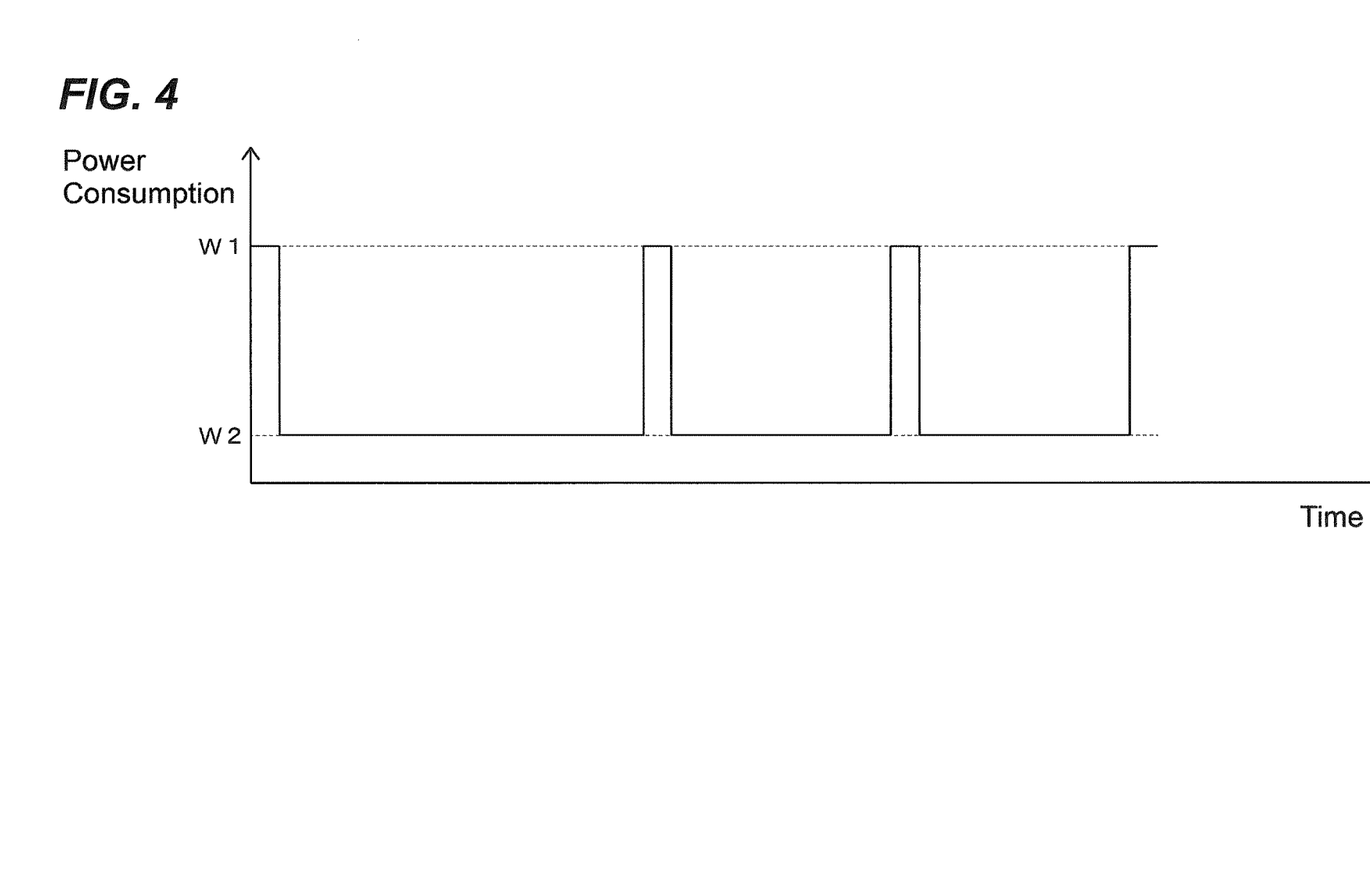
FIG. 4 illustrates an exemplary temporal variation of a power consumption of the MFP according to the embodiment.

FIG. 4 illustrates an exemplary temporal variation of the power consumption of the MFP 10.

In FIG. 4, W1 indicates power consumption when the power state of the MFP 10 is in the normal state. W2 indicates power consumption when the power state of the MFP 10 is in the power-saving state.

As illustrated in FIG. 4, the power state control unit 18a can switch the power state of the MFP 10 from the normal state to the power-saving state where the power consumption is small compared with the power consumption of the normal state. For example, when the MFP 10 has not received any operation via the operation unit 11 other than a button for transition to the power-saving state (hereinafter referred to as a "Sleep button"), or specific received data, such as print data, via the PHY 16 during a specific period or more in the normal state, the power state control unit 18a can switch the power state of the MFP 10 to the power-saving state. When an operation is received via the Sleep button in the normal state, the power state control unit 18a can switch the power state of the MFP 10 to the power-saving state.

Even when the MFP 10 is in the power-saving state, the SUB Controller 19 can execute a basic response to the network. Then the MFP 10 ensures the network connectivity.

The SUB Controller 19 can switch the power state of the MFP 10 from the power-saving state to the normal state where the power consumption is large compared with the power consumption of the power-saving state. For example, when an operation is received via the operation unit 11 in the power-saving state, the SUB Controller 19 can switch the power state of the MFP 10 to the normal state. When the received data via the PHY 16 is data unprocessable for the SUB Controller 19, for example, Simple Network Management Protocol (SNMP) query and print data, in the power-saving state, the SUB Controller 19 switches the power state of the MFP 10 from a non-wake-up state (described below) to a temporary wake-up state (described below), so as to cause the MAIN Controller 18 to temporarily wake up. Then, when the received data via the PHY 16 is specific received data such as print data, the MAIN Controller 18 switches the power state of the MFP 10 from the temporary wake-up state to the normal state. When the SUB Controller 19 receives the received data to be processed by the MAIN Controller 18 via the PHY 16 in the power-saving state, the SUB Controller 19 causes the storage unit 17 to store the received data as the received data 17b, so as to ensure the MAIN Controller 18 after the wake up to be handed over the received data 17b via the storage unit 17.

When the power state of the MFP 10 is in the power-saving state and the received data is unprocessable for the SUB Controller 19, the MFP 10 switches the power state to the temporary wake-up state (described below) from the power-saving state. This causes the MAIN Controller 18 to temporarily wake up, and then causes the MAIN Controller 18 after the wake up to respond to the received data. These processes ensure maintaining of the network connectivity.

Power consumption in the power-saving state is W2 as mainly illustrated in FIG. 4. However, in practice, the power consumption in the power-saving state is not constantly W2 because a temporary wake up of the supply of the electric power to the MAIN Controller 18 is intermittently repeated in the power-saving state. Namely, in the power-saving state, the temporary wake-up state where the electric power is temporarily supplied to the MAIN Controller 18 and the non-wake-up state where the supply of the electric power to the MAIN Controller 18 is halted are repeated.

Figure 5:
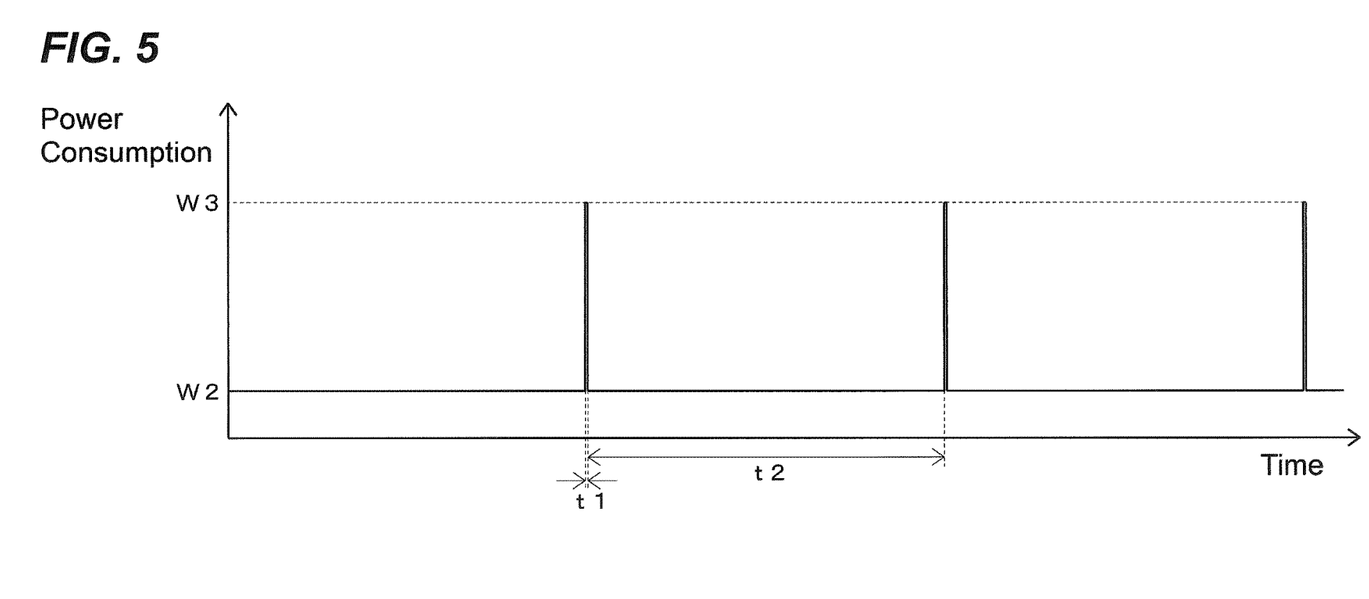
FIG. 5 illustrates an exemplary temporal variation of the power consumption of the MFP according to the embodiment in the power-saving state.

FIG. 5 illustrates an exemplary temporal variation of the power consumption of the MFP 10 in the power-saving state.

In FIG. 5, W3 indicates the power consumption in the temporary wake-up state. W3 is equal to or less than W1 illustrated in FIG. 4. When the normal state and the temporary wake-up state have an identical supply state of the electric power to various devices in the MFP 10, the W3 is equal to the W1. In contrast, when supply of the electric power to a device such as the printer 14, which is supplied with electric power in the normal state, is stopped in the temporary wake-up state, W3 is small compared with W1.

As illustrated in FIG. 5, the SUB Controller 19 intermittently repeats the temporary wake-up state in the power-saving state. Here, a time period t1 of the temporary wake-up state is, usually, extremely short compared with a time period t2 of the non-wake-up state. For example, while the time period t1 is around 100 to 200 milliseconds, the time period t2 is usually around 3 to 30 seconds.

Next, a description will be given of an operation of the MFP 10.

When the power state is switched from the normal state to the power-saving state, the power state control unit 18a sets a value identical to the non-wake-up state time period initial value 17e as the non-wake-up state time period 17d. Accordingly, the SUB Controller 19 sets the time period t2 of a first round of the non-wake-up state in a current power-saving state to the non-wake-up state time period 17d.

Figure 6:
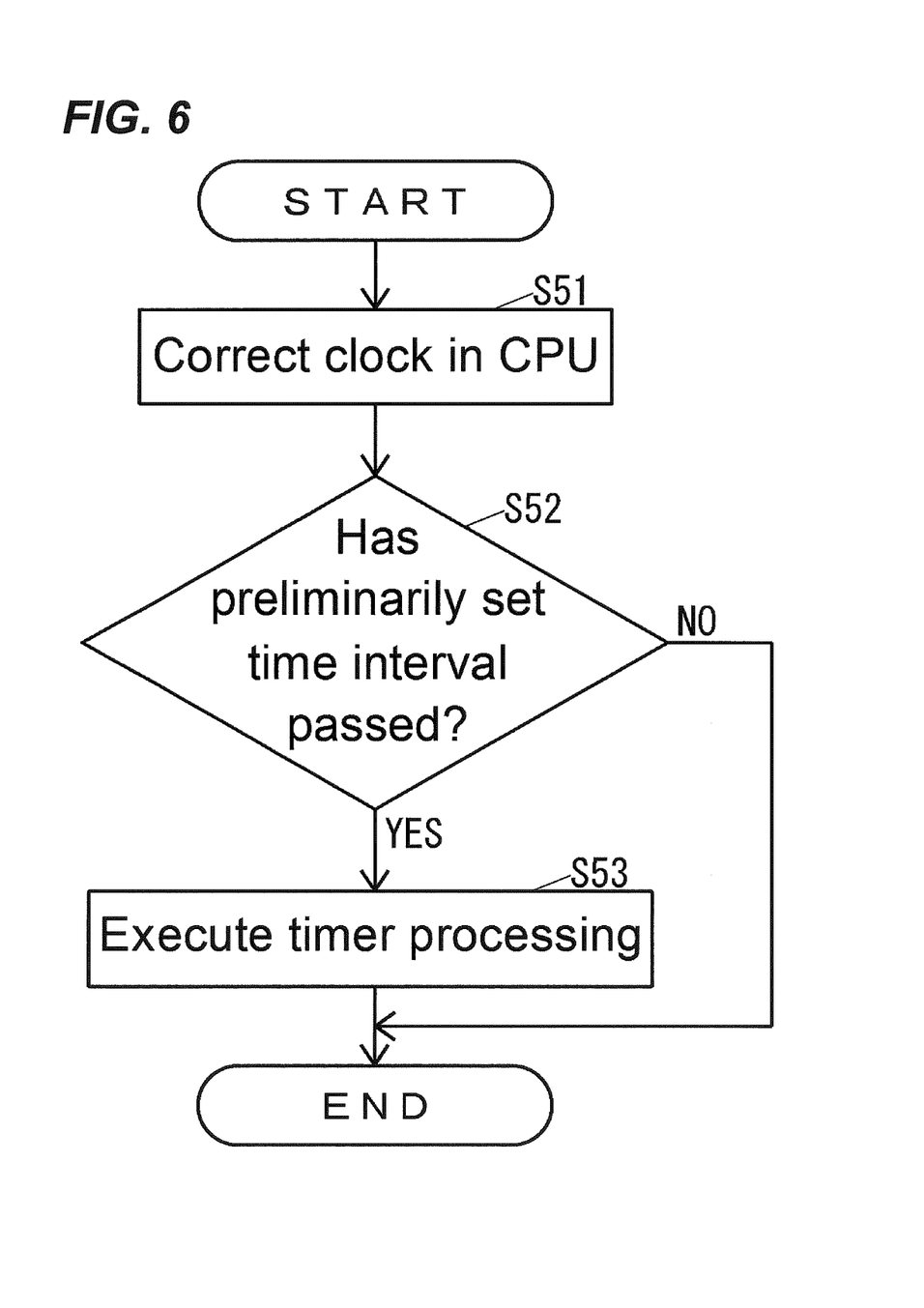
FIG. 6 illustrates an operation of a timer processing unit according to the embodiment in a temporary wake-up state.

FIG. 6 illustrates an operation of the timer processing unit 18b in the temporary wake-up state.

As illustrated in FIG. 6, the timer processing unit 18b causes a real-time clock (not illustrated) to correct a clock in the CPU in the main controller 18 (Step S51).

Next, the timer processing unit 18b determines whether or not a time interval indicated by the timer processing interval 17c has passed after an execution of previous timer processing based on the clock in the CPU in the main controller 18 (Step S52).

When the timer processing unit 18b determines, at Step S52, that the time interval has passed, the timer processing unit 18b executes the timer processing (Step S53), and terminates the operation illustrated in FIG. 6. In contrast, when the timer processing unit 18b determines, at Step S52, that the time interval has not passed, the timer processing unit 18b terminates the operation illustrated in FIG. 6 without executing the timer processing.

The timer processing unit 18b repeats processes of Steps S52 and S53 for each kind of the timer processing.

For example, the timer processing unit 18b requests the DHCP server to update the lease period of the IP address of the MFP 10 at the time interval indicated by the timer processing interval 17c, such as a time interval at which a half of the lease period of the IP address of the MFP 10 has elapsed.

The timer processing unit 18b transmits a report mail at the time interval indicated by the timer processing interval 17c, for example, every one minute.

Figure 7:
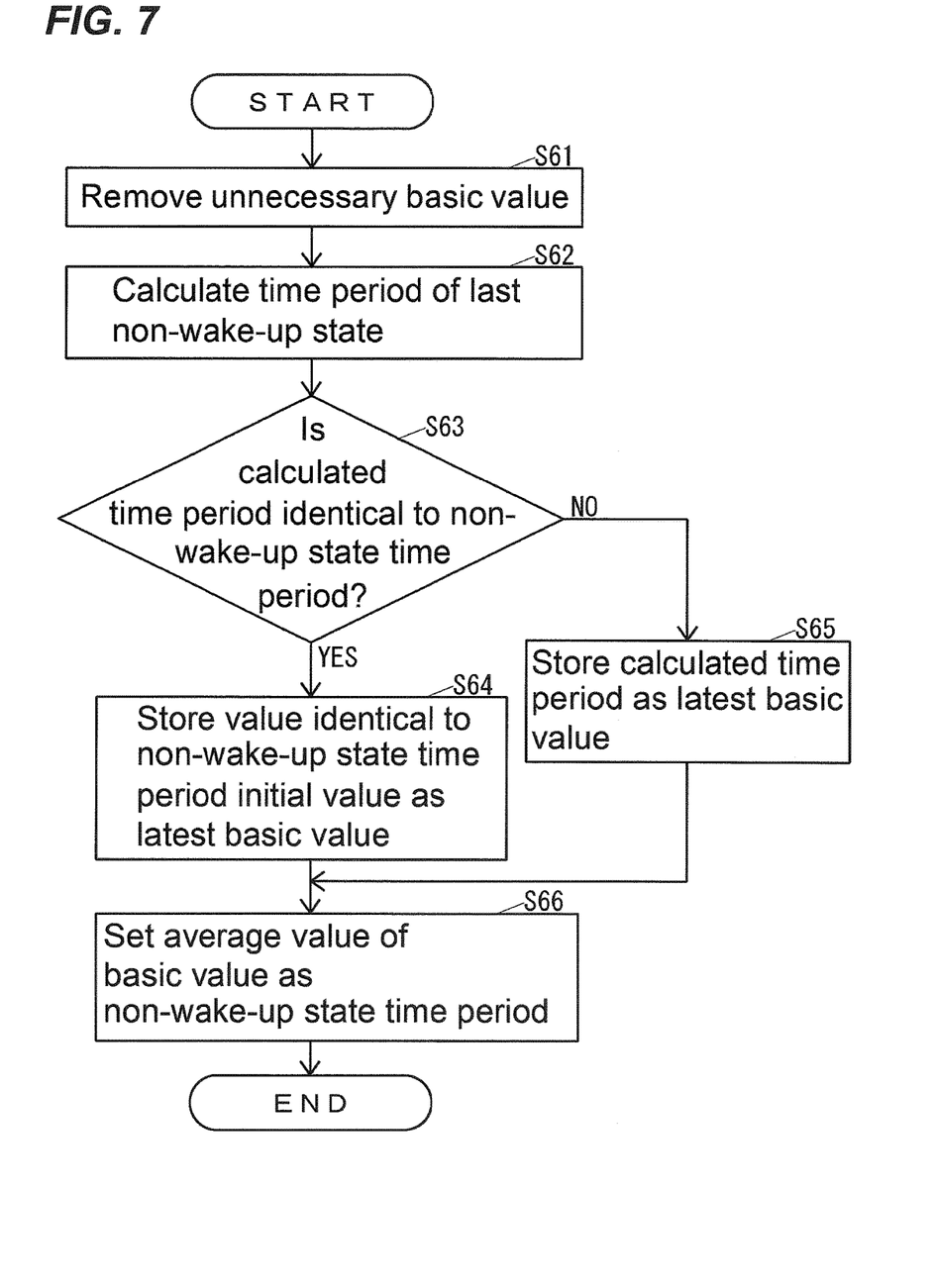
FIG. 7 illustrates an operation of a power state control unit according to the embodiment in the temporary wake-up state.

FIG. 7 illustrates an operation of the power state control unit 18a in the temporary wake-up state.

As illustrated in FIG. 7, the power state control unit 18a removes an unnecessary basic value 17f from the storage unit 17 (Step S61). For example, the power state control unit 18a may remove the basic values 17f other than latest two basic values 17f, which are generated in the current power-saving state, from the storage unit 17, when the basic values 17f other than the latest two basic values 17f, which are generated in the current power-saving state, are registered in the storage unit 17.

After the process at Step S61, the power state control unit 18a calculates the time period t2 of last non-wake-up state (Step S62). Here, when a current temporary wake-up state is a first round of the temporary wake-up state in the current power-saving state, the power state control unit 18a calculates a time period from a start of the current power-saving state to a start of the current temporary wake-up state as the time period t2 of the last non-wake-up state. When the current temporary wake-up state is not the first round of the temporary wake-up state in the current power-saving state, the power state control unit 18a calculates a time period from a termination of a previous temporary wake-up state to a start of the current temporary wake-up state as the time period t2 of the last non-wake-up state.

When the current temporary wake-up state is the first round of the temporary wake-up state in the current power-saving state, the power state control unit 18a can calculate the time period t2 of the last non-wake-up state by subtracting the start time of the current power-saving state from the start time of the current temporary wake-up state. The power state control unit 18a stores a time in the storage unit 17 immediately before the start of the current power-saving state, thus obtaining the start time of the current power-saving state from the storage unit 17. When the electric power is supplied to the SUB Controller 19 even in the power-saving state, the start time of the current power-saving state may be obtained by the CPU in the SUB Controller 19 to be stored in the RAM in the SUB Controller 19, such that the power state control unit 18a obtains the start time of the current power-saving state from the RAM in the SUB Controller 19.

When the current temporary wake-up state is not the first round of the temporary wake-up state in the current power-saving state, the power state control unit 18a can calculate the time period t2 of the last non-wake-up state by subtracting the termination time of the previous temporary wake-up state from the start time of the current temporary wake-up state. The power state control unit 18a stores a time in the storage unit 17 at the termination of the previous temporary wake-up state, thus obtaining the termination time of the previous temporary wake-up state from the storage unit 17. When the electric power is supplied to the SUB Controller 19 even in the power-saving state, the termination time of the previous temporary wake-up state may be obtained by the CPU in the SUB Controller 19 to be stored in the RAM in the SUB Controller 19, such that the power state control unit 18a obtains the termination time of the previous temporary wake-up state from the RAM in the SUB Controller 19.

As the time, the time on the real-time clock or the time on the clock in the CPU corrected by the real-time clock is used.

After the process at Step S62, the power state control unit 18a determines whether or not the time period t2 calculated at Step S62 is identical to the non-wake-up state time period 17d in the storage unit 17 (Step S63).

When the power state control unit 18a determines the time periods are identical at Step S63, the power state control unit 18a stores a value identical to the non-wake-up state time period initial value 17e as a latest basic value 17f in the storage unit 17 (Step S64). In a situation where the power state control unit 18a determines that the time periods are identical at Step S63, the SUB Controller 19 had not received the data that is unprocessable for the SUB Controller 19 in the non-wake-up state before a lapse of the non-wake-up state time period 17d.

When the power state control unit 18a determines the time periods are not identical at Step S63, the power state control unit 18a stores the time period t2 calculated at Step S62 as the latest basic value 17f in the storage unit 17 (Step S65). In a situation where the power state control unit 18a determines that the time periods are not identical at Step S63, the SUB Controller 19 had received the data that is unprocessable for the SUB Controller 19 in the non-wake-up state before a lapse of the non-wake-up state time period 17d.

After the process at Step S64 or Step S65, the power state control unit 18a sets an average value of the basic values 17f stored in the storage unit 17 as the non-wake-up state time period 17d (Step S66), thus terminating the operation indicated in FIG. 7.

After the operation indicated in FIG. 7, the SUB Controller 19 sets the time period t2 of a next non-wake-up state to the non-wake-up state time period 17d.

Figure 8:
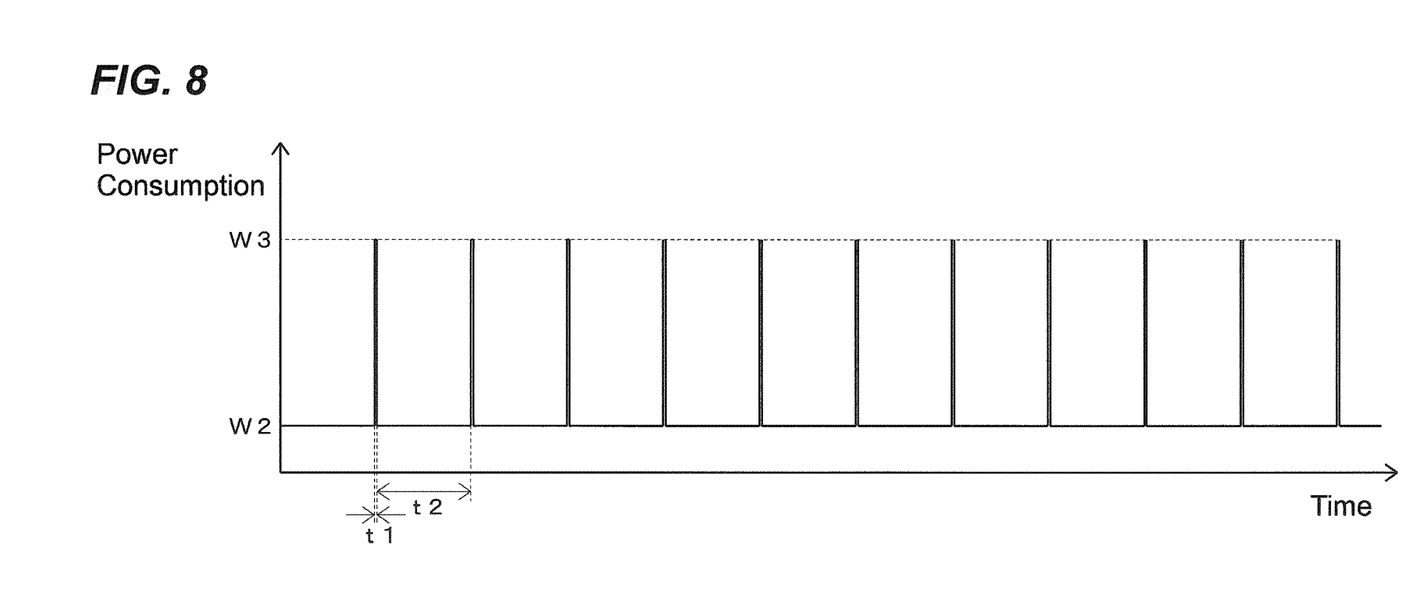
FIG. 8 illustrates an exemplary temporal variation of the power consumption of the MFP according to the embodiment in the power-saving state as an example different from the example illustrated in FIG. 5.

As described above, when the frequency to receive the data unprocessable for the SUB Controller 19 in the power-saving state increases, the MFP 10 sets the non-wake-up state time period 17d to be short in Step S66 so as to increase the frequency of the temporary wake-up state (see FIG. 8). While this increases the power consumption, the responsiveness to the data unprocessable for the SUB Controller 19 can be improved.

On the other hand, when the frequency to receive the data unprocessable for the SUB Controller 19 in the power-saving state decreases, the MFP 10 sets the non-wake-up state time period 17d to be long in Step S66 so as to decrease the frequency of the temporary wake-up state (see FIG. 5). This ensures the power consumption to be decreased.

Accordingly, the MFP 10 can appropriately set the frequency of the temporary wake-up state in the power-saving state regardless of the time period of the temporary wake-up state.

While the electronic device of the disclosure is the MFP according to the embodiment, an image forming apparatus other than the MFP such as a copy-only machine, a printer-only machine, a FAX-only machine, and a scanner-only machine may be employed, and an electronic device other than the image forming apparatus such as a Personal Computer (PC) may be employed.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An electronic device comprising:
   a first processing unit that executes a process corresponding to received data; and
   a second processing unit that executes a process corresponding to the received data with which the first processing unit is not compatible,
   wherein the electronic device includes a power state control unit that controls a power state of the electronic device,
   the power state includes:
      a normal state where the second processing unit that executes the process corresponding to the received data, and
      a power-saving state where a supply of an electric power to the second processing unit is halted at least temporarily while the first processing unit that executes the process corresponding to the received data,
   the power-saving state repeats:
      a temporary wake-up state where the electric power is temporarily supplied to the second processing unit, and
      a non-wake-up state where the supply of the electric power to the second processing unit is halted,
   when the received data with which the first processing unit is not compatible is present in the non-wake-up state, the power state control unit sets the power state of the electronic device to the temporary wake-up state regardless of a period set as a time period of the non-wake-up state, so as to obtain an actual time period of the non-wake-up state as a basic value for calculating the time period of the non-wake-up state, and
   the power state control unit sets an average value of a plurality of obtained latest basic values as the time period of the non-wake-up state.

2. The electronic device according to claim 1, wherein when the received data with which the first processing unit is not compatible is not present in the non-wake-up state, the power state control unit obtains a specific value as the basic value.

3. The electronic device according to claim 2, wherein the power state control unit:
   compares the actual time period of the non-wake-up state with the set average value when the power state control unit switches the power-saving state from the non-wake-up state to the temporary wake-up state,
   obtains the specific value as the basic value if the actual time period is identical to the set average value, and
   obtains the actual time period as the basic value if the actual time period is not identical to the set average value.

4. The electronic device according to claim 1, wherein the power state control unit obtains the specific value as the basic value when the power state control unit switches the power state from the normal state to the power-saving state.

5. The electronic device according to claim 1, wherein in a first round of the temporary wake-up state after the power state unit switches the power state from the normal state to the power-saving state, the power state control unit obtains, as the actual time period, a time period from a start of a first round of the power-saving state to a start of the first round of the temporary wake-up state.

6. A non-transitory computer-readable recording medium storing a power control program,
   wherein the power control program is executed by an electronic device including:
      a first processing unit that executes a process corresponding to received data; and
      a second processing unit that executes a process corresponding to the received data with which the first processing unit is not compatible,
   the power control program causes the electronic device to function as a power state control unit that controls a power state of the electronic device,
   the power state includes:
      a normal state where the second processing unit that executes the process corresponding to the received data, and
      a power-saving state where a supply of an electric power to the second processing unit is halted at least temporarily while the first processing unit that executes the process corresponding to the received data,
   the power-saving state repeats:
      a temporary wake-up state where the electric power is temporarily supplied to the second processing unit, and
      a non-wake-up state where the supply of the electric power to the second processing unit is halted,
   when the received data with which the first processing unit is not compatible is present in the non-wake-up state, the power state control unit sets the power state of the electronic device to the temporary wake-up state regardless of a period set as a time period of the non-wake-up state, so as to obtain an actual time period of the non-wake-up state as a basic value for calculating the time period of the non-wake-up state, and
   the power state control unit sets an average value of a plurality of obtained latest basic values as the time period of the non-wake-up state.

* * * * *